US009699554B1

(12) United States Patent
Choi et al.

(10) Patent No.: US 9,699,554 B1
(45) **Date of Patent: *Jul. 4, 2017**

(54) ADAPTIVE SIGNAL EQUALIZATION

(71) Applicant: Knowles Electronics, LLC, Itasca, IL (US)

(72) Inventors: Sangnam Choi, San Jose, CA (US); Chad Seguin, Morgan Hill, CA (US)

(73) Assignee: Knowles Electronics, LLC, Itasca, IL (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/341,697

(22) Filed: Jul. 25, 2014

Related U.S. Application Data

(63) Continuation of application No. 12/841,098, filed on Jul. 21, 2010, now Pat. No. 8,798,290.

(60) Provisional application No. 61/326,573, filed on Apr. 21, 2010.

(51) Int. Cl.
*H04B 15/00* (2006.01)
*H04R 3/04* (2006.01)

(52) U.S. Cl.
CPC .................................... *H04R 3/04* (2013.01)

(58) Field of Classification Search
CPC .... G10L 21/0208; G10L 21/0316; H04R 3/04
USPC ... 381/71.1, 73.1, 94.1, 94.2, 94.3, 94.4, 98, 381/103; 455/556.1, 570; 379/406.01, 379/406.08, 420.01, 420.02, 420.03
See application file for complete search history.

(56) References Cited

U.S. PATENT DOCUMENTS

| | | | |
|---|---|---|---|
| 3,517,223 | A | 6/1970 | Gaunt et al. |
| 4,025,724 | A | 5/1977 | Davidson, Jr. et al. |
| 4,535,473 | A | 8/1985 | Sakata |
| 4,628,529 | A | 12/1986 | Borth et al. |
| 4,649,505 | A | 3/1987 | Zinser, Jr. et al. |
| 4,658,426 | A | 4/1987 | Chabries et al. |

(Continued)

FOREIGN PATENT DOCUMENTS

| | | |
|---|---|---|
| EP | 1536660 | 6/2005 |
| FI | 20080428 A | 7/2008 |

(Continued)

OTHER PUBLICATIONS

International Search Report and Written Opinion dated Feb. 7, 2011 in Patent Cooperation Treaty Application No. PCT/US10/58600.

(Continued)

*Primary Examiner* — Vivian Chin
*Assistant Examiner* — Friedrich W Fahnert
(74) *Attorney, Agent, or Firm* — Foley & Lardner LLP

(57) ABSTRACT

The present technology substantially reduces undesirable effects of multi-level noise suppression processing by applying an adaptive signal equalization. A noise suppression system may apply different levels of noise suppression based on the (user-perceived) signal-to-noise-ratio (SNR) or based on an estimated echo return loss (ERL). The resulting high-frequency data attenuation may be counteracted by adapting the signal equalization. The present technology may be applied in both transmit and receive paths of communication devices. Intelligibility may particularly be improved under varying noise conditions, e.g., when a mobile device user is moving in and out of noisy environments.

18 Claims, 6 Drawing Sheets

(56) References Cited

U.S. PATENT DOCUMENTS 4,802,227 A 1/1989 Elko et al.
4,811,404 A 3/1989 Vilmur et al.
4,969,203 A 11/1990 Herman
5,050,217 A 9/1991 Orban
5,115,404 A 5/1992 Lo et al.
5,208,864 A 5/1993 Kaneda
5,289,273 A 2/1994 Lang
5,319,736 A 6/1994 Hunt
5,381,473 A 1/1995 Andrea et al.
5,402,496 A 3/1995 Soli et al.
5,440,751 A 8/1995 Santeler et al.
5,544,346 A 8/1996 Amini et al.
5,555,306 A 9/1996 Gerzon
5,574,824 A 11/1996 Slyh et al.
5,590,241 A 12/1996 Park et al.
5,602,962 A 2/1997 Kellermann
5,625,697 A 4/1997 Bowen et al.
5,694,474 A 12/1997 Ngo et al.
5,715,319 A 2/1998 Chu
5,734,713 A 3/1998 Mauney et al.
5,757,937 A 5/1998 Itoh et al.
5,774,837 A 6/1998 Yeldener et al.
5,819,215 A 10/1998 Dobson et al.
5,845,243 A 12/1998 Smart et al.
5,850,453 A * 12/1998 Klayman ............... H03G 5/025 381/1
5,950,153 A 9/1999 Ohmori et al.
5,978,567 A 11/1999 Rebane et al.
5,991,385 A 11/1999 Dunn et al.
6,002,776 A 12/1999 Bhadkamkar et al.
6,011,853 A 1/2000 Koski et al.
6,035,177 A 3/2000 Moses et al.
6,061,456 A 5/2000 Andrea et al.
6,065,883 A 5/2000 Herring et al.
6,072,881 A 6/2000 Linder
6,084,916 A 7/2000 Ott
6,097,820 A 8/2000 Turner
6,134,524 A 10/2000 Peters et al.
6,144,937 A 11/2000 Ali
6,188,769 B1 2/2001 Jot et al.
6,205,422 B1 3/2001 Gu et al.
6,219,408 B1 4/2001 Kurth
6,222,927 B1 4/2001 Feng et al.
6,281,749 B1 8/2001 Klayman et al.
6,289,311 B1 9/2001 Omori et al.
6,317,501 B1 11/2001 Matsuo
6,321,193 B1 11/2001 Nystrom et al.
6,327,370 B1 12/2001 Killion et al.
6,363,345 B1 3/2002 Marash et al.
6,377,915 B1 4/2002 Sasaki
6,381,284 B1 4/2002 Strizhevskiy
6,381,469 B1 4/2002 Wojick
6,389,142 B1 5/2002 Hagen et al.
6,430,295 B1 8/2002 Handel et al.
6,453,289 B1 9/2002 Ertem et al.
6,480,610 B1 11/2002 Fang et al.
6,504,926 B1 1/2003 Edelson et al.
6,539,355 B1 3/2003 Omori et al.
6,549,586 B2 4/2003 Gustafsson et al.
6,549,630 B1 4/2003 Bobisuthi
6,584,203 B2 6/2003 Elko et al.
6,615,169 B1 * 9/2003 Ojala .................... G10L 19/012 704/205
6,717,991 B1 * 4/2004 Gustafsson ............ H04R 3/005 375/285
6,738,482 B1 5/2004 Jaber
6,748,095 B1 6/2004 Goss
6,757,395 B1 6/2004 Fang et al.
6,760,450 B2 7/2004 Matsuo
6,768,979 B1 7/2004 Menendez-Pidal et al.
6,785,381 B2 8/2004 Gartner et al.
6,795,558 B2 9/2004 Matsuo
6,873,837 B1 3/2005 Yoshioka et al.
6,882,736 B2 4/2005 Dickel et al.
6,895,375 B2 5/2005 Malah et al.
6,917,688 B2 7/2005 Yu et al.
6,931,123 B1 8/2005 Hughes
6,978,159 B2 12/2005 Feng et al.
6,980,528 B1 12/2005 LeBlanc et al.
7,010,134 B2 3/2006 Jensen
7,016,507 B1 3/2006 Brennan
RE39,080 E 4/2006 Johnston
7,031,478 B2 4/2006 Belt et al.
7,035,666 B2 4/2006 Silberfenig et al.
7,058,572 B1 6/2006 Nemer
7,099,821 B2 8/2006 Visser et al.
7,103,176 B2 9/2006 Rodriguez et al.
7,117,145 B1 10/2006 Venkatesh et al.
7,142,677 B2 11/2006 Gonopolskiy et al.
7,145,710 B2 12/2006 Holmes
7,146,316 B2 12/2006 Alves
7,155,019 B2 12/2006 Hou
7,171,008 B2 1/2007 Elko
7,174,022 B1 2/2007 Zhang et al.
7,190,775 B2 3/2007 Rambo
7,206,418 B2 4/2007 Yang et al.
7,221,622 B2 5/2007 Matsuo et al.
7,245,710 B1 7/2007 Hughes
7,246,058 B2 7/2007 Burnett
7,343,282 B2 3/2008 Kirla et al.
7,379,866 B2 5/2008 Gao
7,447,631 B2 11/2008 Truman et al.
7,461,003 B1 12/2008 Tanrikulu
7,546,237 B2 6/2009 Nongpiur et al.
7,548,791 B1 6/2009 Johnston
7,562,140 B2 7/2009 Clemm et al.
7,617,099 B2 11/2009 Yang et al.
7,617,282 B2 11/2009 Han
7,664,495 B1 2/2010 Bonner et al.
7,685,132 B2 3/2010 Hyman
7,773,741 B1 * 8/2010 LeBlanc ................. G10L 25/90 379/406.01
7,783,481 B2 8/2010 Endo et al.
7,791,508 B2 9/2010 Wegener
7,792,680 B2 9/2010 Iser et al.
7,796,978 B2 9/2010 Jones et al.
7,813,931 B2 10/2010 Hetherington et al.
7,899,565 B1 3/2011 Johnston
7,949,522 B2 5/2011 Hetherington et al.
7,953,596 B2 5/2011 Pinto
7,970,123 B2 6/2011 Beaucoup
8,010,355 B2 8/2011 Rahbar
8,032,364 B1 10/2011 Watts
8,036,767 B2 10/2011 Soulodre
8,078,474 B2 12/2011 Vos et al.
8,112,284 B2 2/2012 Kjorling et al.
8,175,291 B2 5/2012 Chan et al.
8,180,064 B1 5/2012 Avendano et al.
8,189,429 B2 5/2012 Chen et al.
8,190,429 B2 5/2012 Iser et al.
8,194,880 B2 * 6/2012 Avendano .............. H04R 3/005 381/122
8,204,252 B1 6/2012 Avendano
8,204,253 B1 6/2012 Solbach
8,229,137 B2 7/2012 Romesburg
8,249,861 B2 8/2012 Li et al.
8,271,292 B2 9/2012 Osada et al.
8,280,730 B2 10/2012 Song et al.
8,280,731 B2 10/2012 Yu
8,345,890 B2 1/2013 Avendano et al.
8,363,823 B1 1/2013 Santos
8,369,973 B2 2/2013 Risbo
8,438,026 B2 5/2013 Fischer et al.
8,447,596 B2 5/2013 Avendano et al.
8,467,891 B2 6/2013 Huang et al.
8,473,287 B2 6/2013 Every et al.
8,521,530 B1 8/2013 Every et al.
8,531,286 B2 9/2013 Friar et al.
8,606,249 B1 12/2013 Goodwin
8,615,392 B1 12/2013 Goodwin
8,615,394 B1 12/2013 Avendano et al.
8,639,516 B2 1/2014 Lindahl et al.
8,694,310 B2 4/2014 Taylor
8,700,391 B1 4/2014 Avendano et al.

(56) References Cited

U.S. PATENT DOCUMENTS 8,705,759 B2 4/2014 Wolff et al.
8,718,290 B2 5/2014 Murgia et al.
8,750,526 B1 6/2014 Santos et al.
8,774,423 B1 7/2014 Solbach
8,798,290 B1 8/2014 Choi et al.
8,867,759 B2 10/2014 Avendano et al.
8,903,721 B1 12/2014 Cowan
8,934,641 B2 1/2015 Avendano et al.
9,007,416 B1 4/2015 Murgia et al.
9,076,456 B1 7/2015 Avendano et al.
9,185,487 B2 11/2015 Solbach et al.
9,197,974 B1 11/2015 Clark et al.
9,210,503 B2 12/2015 Avendano et al.
9,245,538 B1 1/2016 Avendano et al.
2001/0016020 A1 8/2001 Gustafsson et al.
2001/0031053 A1 10/2001 Feng et al.
2001/0038699 A1 11/2001 Hou
2002/0009203 A1 1/2002 Erten
2002/0041678 A1 4/2002 Basburg-Ertem et al.
2002/0041693 A1 4/2002 Matsuo
2002/0052734 A1 5/2002 Unno et al.
2002/0071342 A1 6/2002 Marple et al.
2002/0080980 A1 6/2002 Matsuo
2002/0106092 A1 8/2002 Matsuo
2002/0116187 A1 8/2002 Erten
2002/0128839 A1 9/2002 Lindgren et al.
2002/0138263 A1 9/2002 Deligne et al.
2002/0160751 A1 10/2002 Sun et al.
2002/0177995 A1 11/2002 Walker
2003/0023430 A1 1/2003 Wang et al.
2003/0026437 A1 2/2003 Janse et al.
2003/0039369 A1 2/2003 Bullen
2003/0056220 A1 3/2003 Thornton et al.
2003/0061032 A1 3/2003 Gonopolskiy
2003/0072382 A1 4/2003 Raleigh et al.
2003/0072460 A1 4/2003 Gonopolskiy et al.
2003/0093278 A1 5/2003 Malah
2003/0093279 A1 5/2003 Malah et al.
2003/0099345 A1 5/2003 Gartner et al.
2003/0099370 A1 5/2003 Moore
2003/0118200 A1 6/2003 Beaucoup et al.
2003/0138116 A1 7/2003 Jones et al.
2003/0147538 A1 8/2003 Elko
2003/0169891 A1 9/2003 Ryan et al.
2003/0177006 A1 9/2003 Ichikawa et al.
2003/0179888 A1 9/2003 Burnett et al.
2004/0001450 A1* 1/2004 He .......................... H04B 3/23 370/286
2004/0066940 A1 4/2004 Amir
2004/0076190 A1 4/2004 Goel et al.
2004/0102967 A1 5/2004 Furuta et al.
2004/0133421 A1 7/2004 Burnett et al.
2004/0145871 A1 7/2004 Lee
2004/0153313 A1 8/2004 Aubauer et al.
2004/0184882 A1 9/2004 Cosgrove
2005/0008169 A1 1/2005 Muren et al.
2005/0049857 A1 3/2005 Seltzer et al.
2005/0049864 A1 3/2005 Kaltenmeier et al.
2005/0060142 A1 3/2005 Visser et al.
2005/0080616 A1 4/2005 Leung et al.
2005/0114123 A1 5/2005 Lukac et al.
2005/0152559 A1 7/2005 Gierl et al.
2005/0185813 A1 8/2005 Sinclair et al.
2005/0203735 A1 9/2005 Ichikawa
2005/0213739 A1 9/2005 Rodman et al.
2005/0213778 A1 9/2005 Buck et al.
2005/0240399 A1 10/2005 Makinen
2005/0249292 A1 11/2005 Zhu
2005/0261896 A1 11/2005 Schuijers et al.
2005/0267369 A1 12/2005 Lazenby et al.
2005/0267741 A1 12/2005 Laaksonen et al.
2005/0276363 A1 12/2005 Joublin et al.
2005/0276423 A1 12/2005 Aubauer et al.
2005/0281410 A1 12/2005 Grosvenor et al.
2005/0283544 A1 12/2005 Yee
2006/0063560 A1 3/2006 Herle
2006/0074646 A1 4/2006 Alves et al.
2006/0092918 A1 5/2006 Talalai
2006/0100868 A1 5/2006 Hetherington et al.
2006/0116874 A1 6/2006 Samuelsson et al.
2006/0120537 A1 6/2006 Burnett et al.
2006/0122832 A1 6/2006 Takiguchi et al.
2006/0133621 A1 6/2006 Chen et al.
2006/0136203 A1 6/2006 Ichikawa
2006/0206320 A1 9/2006 Li
2006/0222184 A1 10/2006 Buck et al.
2006/0224382 A1 10/2006 Taneda
2006/0247922 A1 11/2006 Hetherington et al.
2006/0282263 A1 12/2006 Vos et al.
2007/0003097 A1 1/2007 Langberg et al.
2007/0005351 A1 1/2007 Sathyendra et al.
2007/0021958 A1 1/2007 Visser et al.
2007/0025562 A1 2/2007 Zalewski et al.
2007/0027685 A1 2/2007 Arakawa et al.
2007/0033020 A1 2/2007 (Kelleher) Francois et al.
2007/0041589 A1 2/2007 Patel et al.
2007/0058822 A1 3/2007 Ozawa
2007/0064817 A1 3/2007 Dunne et al.
2007/0078649 A1 4/2007 Hetherington et al.
2007/0081075 A1 4/2007 Canova, Jr. et al.
2007/0116300 A1 5/2007 Chen
2007/0127668 A1 6/2007 Ahya et al.
2007/0150268 A1 6/2007 Acero et al.
2007/0154031 A1 7/2007 Avendano et al.
2007/0165879 A1 7/2007 Deng et al.
2007/0185587 A1 8/2007 Kondo
2007/0253574 A1 11/2007 Soulodre
2007/0282604 A1 12/2007 Gartner et al.
2007/0287490 A1 12/2007 Green et al.
2007/0299655 A1 12/2007 Laaksonen et al.
2008/0033723 A1 2/2008 Jang et al.
2008/0069366 A1 3/2008 Soulodre
2008/0071540 A1 3/2008 Nakano et al.
2008/0111734 A1 5/2008 Fam et al.
2008/0159507 A1 7/2008 Virolainen et al.
2008/0160977 A1 7/2008 Ahmaniemi et al.
2008/0187143 A1 8/2008 Mak-Fan
2008/0192955 A1 8/2008 Merks
2008/0201138 A1 8/2008 Visser et al.
2008/0215344 A1 9/2008 Song et al.
2008/0233934 A1 9/2008 Diethorn
2008/0247567 A1 10/2008 Kjolerbakken et al.
2008/0259731 A1 10/2008 Happonen
2008/0260175 A1 10/2008 Elko
2008/0298571 A1 12/2008 Kurtz et al.
2008/0304677 A1 12/2008 Abolfathi et al.
2008/0317259 A1 12/2008 Zhang et al.
2009/0034755 A1 2/2009 Short et al.
2009/0060222 A1 3/2009 Jeong et al.
2009/0063142 A1 3/2009 Sukkar
2009/0063143 A1 3/2009 Schmidt et al.
2009/0089054 A1 4/2009 Wang et al.
2009/0116656 A1 5/2009 Lee et al.
2009/0119099 A1 5/2009 Lee et al.
2009/0134829 A1 5/2009 Baumann et al.
2009/0141908 A1 6/2009 Jeong et al.
2009/0147942 A1 6/2009 Culter
2009/0150144 A1 6/2009 Nongpiur et al.
2009/0150149 A1 6/2009 Culter et al.
2009/0164905 A1 6/2009 Ko
2009/0192791 A1 7/2009 El-Maleh et al.
2009/0204413 A1 8/2009 Sintes et al.
2009/0226010 A1 9/2009 Schnell et al.
2009/0240497 A1 9/2009 Usher et al.
2009/0264114 A1 10/2009 Virolainen et al.
2009/0287496 A1 11/2009 Thyssen et al.
2009/0299742 A1 12/2009 Toman et al.
2009/0303350 A1 12/2009 Terada
2009/0323655 A1 12/2009 Cardona et al.
2009/0323925 A1 12/2009 Sweeney et al.
2009/0323981 A1 12/2009 Cutler
2009/0323982 A1* 12/2009 Solbach ................. H04R 3/005 381/94.3
2010/0017205 A1 1/2010 Visser et al.

(56) References Cited

U.S. PATENT DOCUMENTS

| | | | |
|---|---|---|---|
| 2010/0033427 | A1 | 2/2010 | Marks et al. |
| 2010/0036659 | A1 | 2/2010 | Haulick et al. |
| 2010/0063807 | A1 | 3/2010 | Archibald et al. |
| 2010/0076756 | A1 | 3/2010 | Douglas et al. |
| 2010/0087220 | A1 | 4/2010 | Zheng et al. |
| 2010/0092007 | A1 | 4/2010 | Sun |
| 2010/0094643 | A1 | 4/2010 | Avendano et al. |
| 2010/0105447 | A1 | 4/2010 | Sibbald et al. |
| 2010/0128123 | A1 | 5/2010 | Dipoala |
| 2010/0130198 | A1 | 5/2010 | Kannappan et al. |
| 2010/0166199 | A1 | 7/2010 | Seydoux |
| 2010/0215184 | A1 | 8/2010 | Buck et al. |
| 2010/0217837 | A1 | 8/2010 | Ansari et al. |
| 2010/0223054 | A1 | 9/2010 | Nemer et al. |
| 2010/0245624 | A1 | 9/2010 | Beaucoup |
| 2010/0278352 | A1 | 11/2010 | Petit et al. |
| 2010/0303298 | A1 | 12/2010 | Marks et al. |
| 2010/0315482 | A1 | 12/2010 | Rosenfeld et al. |
| 2011/0019833 | A1 | 1/2011 | Kuech et al. |
| 2011/0019838 | A1 | 1/2011 | Kaulberg et al. |
| 2011/0035213 | A1 | 2/2011 | Malenovsky et al. |
| 2011/0038486 | A1 | 2/2011 | Beaucoup |
| 2011/0038557 | A1 | 2/2011 | Closset et al. |
| 2011/0044324 | A1 | 2/2011 | Li et al. |
| 2011/0081024 | A1 | 4/2011 | Soulodre |
| 2011/0081026 | A1 | 4/2011 | Ramakrishnan et al. |
| 2011/0107367 | A1 | 5/2011 | Georgis et al. |
| 2011/0129095 | A1 | 6/2011 | Avendano et al. |
| 2011/0173006 | A1 | 7/2011 | Nagel et al. |
| 2011/0173542 | A1 | 7/2011 | Imes et al. |
| 2011/0182436 | A1 | 7/2011 | Murgia et al. |
| 2011/0191101 | A1 | 8/2011 | Uhle et al. |
| 2011/0224994 | A1 | 9/2011 | Norvell et al. |
| 2011/0257967 | A1 | 10/2011 | Every et al. |
| 2011/0257980 | A1 | 10/2011 | Gao |
| 2011/0280154 | A1 | 11/2011 | Silverstrim et al. |
| 2011/0286605 | A1 | 11/2011 | Furuta et al. |
| 2011/0300806 | A1 | 12/2011 | Lindahl et al. |
| 2011/0305345 | A1 | 12/2011 | Bouchard et al. |
| 2012/0010881 | A1 | 1/2012 | Avendano et al. |
| 2012/0027217 | A1 | 2/2012 | Jun et al. |
| 2012/0050582 | A1 | 3/2012 | Seshadri et al. |
| 2012/0062729 | A1 | 3/2012 | Hart et al. |
| 2012/0116769 | A1 | 5/2012 | Malah et al. |
| 2012/0121096 | A1 | 5/2012 | Chen et al. |
| 2012/0133728 | A1 | 5/2012 | Lee |
| 2012/0182429 | A1 | 7/2012 | Forutanpour et al. |
| 2012/0202485 | A1 | 8/2012 | Mirbaha et al. |
| 2012/0209611 | A1 | 8/2012 | Furuta et al. |
| 2012/0231778 | A1 | 9/2012 | Chen et al. |
| 2012/0249785 | A1 | 10/2012 | Sudo et al. |
| 2012/0250882 | A1 | 10/2012 | Mohammad et al. |
| 2013/0034243 | A1 | 2/2013 | Yermeche et al. |
| 2013/0051543 | A1 | 2/2013 | McDysan et al. |
| 2013/0096914 | A1 | 4/2013 | Avendano et al. |
| 2013/0182857 | A1 | 7/2013 | Namba et al. |
| 2013/0322461 | A1 | 12/2013 | Poulsen |
| 2013/0332156 | A1 | 12/2013 | Tackin et al. |
| 2013/0332171 | A1 | 12/2013 | Avendano et al. |
| 2016/0066088 | A1 | 3/2016 | Avendano et al. |

FOREIGN PATENT DOCUMENTS

| | | | |
|---|---|---|---|
| FI | 20125600 | | 6/2012 |
| JP | H062110349 | | 5/1987 |
| JP | H04184400 | A | 7/1992 |
| JP | H05300419 | | 11/1993 |
| JP | H06269083 | A | 9/1994 |
| JP | H07336793 | | 12/1995 |
| JP | H10313497 | A | 11/1998 |
| JP | H11249693 | A | 9/1999 |
| JP | 2005110127 | A | 4/2005 |
| JP | 2005195955 | A | 7/2005 |
| JP | 2006515490 | | 5/2006 |
| JP | 2007201818 | | 8/2007 |
| JP | 2008542798 | | 11/2008 |
| JP | 2009037042 | | 2/2009 |
| JP | 2009522942 | A | 6/2009 |
| JP | 5007442 | B2 | 6/2012 |
| JP | 2013513306 | | 4/2013 |
| KR | 1020080092404 | | 10/2008 |
| KR | 1020120101457 | | 9/2012 |
| KR | 101210313 | B1 | 12/2012 |
| TW | 201143475 | | 12/2011 |
| WO | WO8400634 | | 2/1984 |
| WO | WO2007081916 | A2 | 7/2007 |
| WO | WO2008034221 | | 3/2008 |
| WO | WO2011068901 | | 6/2011 |
| WO | WO2013188562 | | 12/2013 |

OTHER PUBLICATIONS

International Search Report dated Dec. 20, 2013 in Patent Cooperation Treaty Application No. PCT/US2013/045462, filed Jun. 12, 2013.

Office Action dated Aug. 26, 2014 in Japan Application No. 2012-542167, filed Dec. 1, 2010.

Office Action mailed Oct. 31, 2014 in Finland Patent Application No. 20125600, filed Jun. 1, 2012.

Office Action mailed Jul. 21, 2015 in Japan Patent Application No. 2012-542167, filed Dec. 1, 2010.

Office Action mailed Sep. 29, 2015 in Finland Patent Application No. 20125600, filed Dec. 1, 2010.

Allowance mailed Nov. 17, 2015 in Japan Patent Application No. 2012-542167, filed Dec. 1, 2010.

International Search Report & Written Opinion dated Dec. 14, 2015 in Patent Cooperation Treaty Application No. PCT/US2015/049816, filed Sep. 11, 2015.

International Search Report & Written Opinion dated Dec. 22, 2015 in Patent Cooperation Treaty Application No. PCT/US2015/052433, filed Sep. 25, 2015.

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al., "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. et al., "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al., "New Insights into the Noise Reduction Wiener Filter", IEEE Transactions on Audio, Speech, and Language Processing. vol. 14, No. 4, Jul. 2006, pp. 1218-1234.

Cohen, Israel et al., "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

Fuchs, Martin et al., "Noise Suppression for Automotive Applications Based on Directional Information", 2004 IEEE International Conference on Acoustics, Speech, and Signal Processing, May 17-21, pp. 237-240.

(56) References Cited

OTHER PUBLICATIONS

Goubran, R.A. et al., "Acoustic Noise Suppression Using Regressive Adaptive Filtering", 1990 IEEE 40th Vehicular Technology Conference, May 6-9, pp. 48-53.
Liu, Chen et al., "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al., "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Mizumachi, Mitsunori et al., "Noise Reduction by Paired-Microphones Using Spectral Subtraction", 1998 IEEE International Conference on Acoustics, Speech and Signal Processing, May 12-15. pp. 1001-1004.
Moonen, Marc et al., "Multi-Microphone Signal Enhancement Techniques for Noise Suppression and Dereverbration," http://www.esat.kuleuven.ac.be/sista/yearreport97//node37.html, accessed on Apr. 21, 1998.
Parra, Lucas et al., "Convolutive Blind Separation of Non-Stationary Sources", IEEE Transactions on Speech and Audio Processing. vol. 8, No. 3, May 2008, pp. 320-327.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Tashev, Ivan et al., "Microphone Array for Headset with Spatial Noise Suppressor", http://research.microsoft.com/users/ivantash/Documents/Tashev_MAforHeadset_HSCMA_05.pdf. (4 pages).
Valin, Jean-Marc et al., "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Widrow, B. et al., "Adaptive Antenna Systems," Proceedings of the IEEE, vol. 55, No. 12, pp. 2143-2159, Dec. 1967.
International Search Report and Written Opinion dated Oct. 19, 2007 in Patent Cooperation Treaty Application No. PCT/US2007/000463.
Office Action mailed Jun. 18, 2014 in Finland Patent Application No. 20080428, filed Jul. 4, 2008.
Office Action mailed Jun. 4, 2015 in Finland Patent Application 20080428, filed Jan. 5, 2007.
Non-Final Office Action, Jun. 1, 2016, U.S. Appl. No. 14/094,347, filed Dec. 20, 2013.
Non-Final Office Action, Mar. 30, 2010, U.S. Appl. No. 11/343,524, filed Jan. 30, 2006.
Non-Final Office Action, Sep. 13, 2010, U.S. Appl. No. 11/343,524, filed Jan. 30, 2006.
Final Office Action, Mar. 30, 2011, U.S. Appl. No. 11/343,524, filed Jan. 30, 2006.
Final Office Action, May 21, 2012, U.S. Appl. No. 11/343,524, filed Jan. 30, 2006.
Notice of Allowance, Oct. 9, 2012, U.S. Appl. No. 11/343,524, filed Jan. 30, 2006.
Non-Final Office Action, Oct. 3, 2011, U.S. Appl. No. 12/004,788, filed Dec. 21, 2007.
Notice of Allowance, Feb. 23, 2012, U.S. Appl. No. 12/004,788, filed Dec. 21, 2007.
Non-Final Office Action, Jul. 13, 2011, U.S. Appl. No. 12/217,076, filed Jun. 30, 2008.
Final Office Action, Nov. 16, 2011, U.S. Appl. No. 12/217,076, filed Jun. 30, 2008.
Non-Final Office Action, Mar. 14, 2012, U.S. Appl. No. 12/217,076, filed Jun. 30, 2008.
Final Office Action, Sep. 19, 2012, U.S. Appl. No. 12/217,076, filed Jun. 30, 2008.
Notice of Allowance, Apr. 15, 2013, U.S. Appl. No. 12/217,076, filed Jun. 30, 2008.
Non-Final Office Action, May 1, 2013, U.S. Appl. No. 12/895,254, filed Sep. 30, 2010.
Notice of Allowance, Oct. 21, 2013, U.S. Appl. No. 12/895,254, filed Sep. 30, 2010.
Non-Final Office Action, Nov. 1, 2012, U.S. Appl. No. 12/907,788, filed Oct. 19, 2010.
Final Office Action, Mar. 7, 2013, U.S. Appl. No. 12/907,788, filed Oct. 19, 2010.
Non-Final Office Action, Aug. 6, 2013, U.S. Appl. No. 12/907,788, filed Oct. 19, 2010
Final Office Action, May 19, 2014, U.S. Appl. No. 12/907,788, filed Oct. 19, 2010.
Notice of Allowance, Sep. 21, 2015, U.S. Appl. No. 12/907,788, filed Oct. 19, 2010.
Non-Final Office Action, Jul. 15, 2014, U.S. Appl. No. 13/432,490, filed Mar. 28, 2012.
Notice of Allowance, Apr. 3, 2015, U.S. Appl. No. 13/432,490, filed Mar. 28, 2012.
Non-Final Office Action, Jun. 4, 2013, U.S. Appl. No. 13/705,132, filed Dec. 4, 2012.
Final Office Action, Dec. 19, 2013, U.S. Appl. No. 13/705,132, filed Dec. 4, 2012.
Notice of Allowance, Jun. 19, 2014, U.S. Appl. No. 13/705,132, filed Dec. 4, 2012.
Non-Final Office Action, Apr. 21, 2016, U.S. Appl. No. 14/477,761, filed Sep. 4, 2014.

* cited by examiner

ADAPTIVE SIGNAL EQUALIZATION

CROSS REFERENCE TO RELATED APPLICATIONS

This application is a continuation of U.S. patent application Ser. No. 12/841,098, filed on Jul. 21, 2010, which, in turn, claims the benefit of U.S. Provisional Application No. 61/326,573, filed on Apr. 21, 2010, which are hereby incorporated herein by reference in their entirety.

BACKGROUND

Communication devices that capture, transmit and playback acoustic signals can use many signal processing techniques to provide a higher quality (i.e., more intelligible) signal. The signal-to-noise ratio is one way to quantify audio quality in communication devices such as mobile telephones, which convert analog audio to digital audio data streams for transmission over mobile telephone networks.

A device that receives an acoustic signal, for example through a microphone, can process the signal to distinguish between a desired and an undesired component. A side effect of many techniques for such signal processing may be reduced intelligibility.

There is a need to alleviate detrimental side effects that occur in communication devices due to signal processing.

SUMMARY OF THE INVENTION

The systems and methods of the present technology provide audio processing in a communication device by performing equalization on a noise-suppressed acoustic signal in order to alleviate detrimental side effects of noise suppression. Equalization may be performed based on a level of noise suppression performed on an acoustic signal. An indicator of the noise suppression (and therefore a basis for performing the equalization) may be a signal-to-noise ratio (SNR), a perceived SNR, or a measure of the echo return loss (ERL). The equalization applied to one or more acoustic signals may thus be adjusted according to a SNR (or perceived SNR) or ERL for a signal.

In some embodiments, the present technology provides methods for audio processing that include receiving a first acoustic signal selected from a group consisting of a near-end acoustic signal and a far-end acoustic signal, the first acoustic signal including a noise component and a signal-to-noise ratio. An adjusted signal-to-noise ratio may be automatically determined based on characteristics of the first acoustic signal. A noise component of a second acoustic signal may be suppressed, wherein the second acoustic signal is selected from a group consisting of the near-end acoustic signal and the far-end acoustic signal. Equalization may be performed on the noise-suppressed second acoustic signal based on the adjusted signal-to-noise ratio of the first acoustic signal.

In some embodiments, the present technology provides methods for audio processing that include estimating an amount of echo return loss based on a far-end acoustic signal in a communication device. A noise component of a first acoustic signal may be suppressed, wherein the first acoustic signal is selected from a group consisting of the near-end acoustic signal and the far-end acoustic signal. Equalization may be performed on the noise-suppressed first acoustic signal based on the estimated amount of echo return loss.

In some embodiments, the present technology provides systems for audio processing in a communication device that include a microphone, a receiver, an executable module that determines an adjusted signal-to-noise ratio, an executable module that suppresses a noise component, and an equalizer. The microphone receives a near-end acoustic signal, the near-end acoustic signal including a noise component and a signal-to-noise ratio. The receiver receives a far-end acoustic signal, the far-end acoustic signal including a noise component and a signal-to-noise ratio. One executable module determines an adjusted signal-to-noise ratio of a first acoustic signal, wherein the first acoustic signal is selected from a group consisting of the near-end acoustic signal and the far-end acoustic signal. One executable module suppresses a noise component in a second acoustic signal, wherein the second acoustic signal is selected from a group consisting of the near-end acoustic signal and the far-end acoustic signal. The equalizer equalizes the noise-suppressed second acoustic signal based on the adjusted signal-to-noise ratio of the first acoustic signal.

In some embodiments, the present technology provides systems for audio processing in a communication device that include an executable module that estimates an amount of echo return loss, an executable module that suppresses a noise component, and an equalizer. One executable module estimates an amount of echo return loss based on a far-end acoustic signal in a communication device. One executable module suppresses a noise component in a first acoustic signal, wherein the first acoustic signal is selected from a group consisting of the near-end acoustic signal and the far-end acoustic signal. The equalizer equalizes the noise-suppressed second acoustic signal based on estimated amount of echo return loss.

DESCRIPTION OF EXEMPLARY EMBODIMENTS

Figure 1:
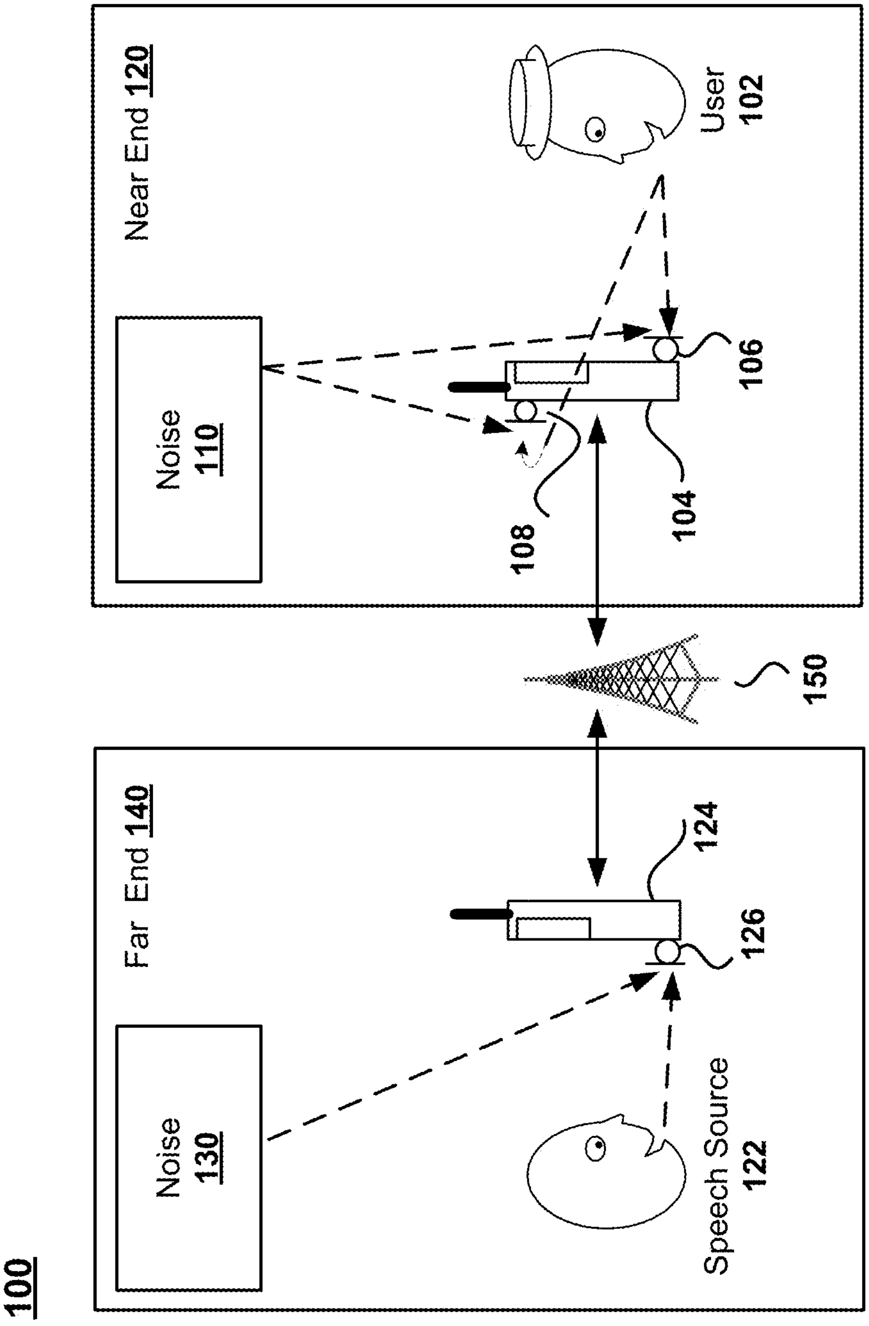
FIG. 1 illustrates an environment in which embodiments of the present technology may be practiced.

The present technology provides audio processing of an acoustic signal to perform adaptive signal equalization. The present system may perform equalization during post processing based on a level of noise suppression performed on an acoustic signal. An indicator of the noise suppression may be a signal-to-noise ratio (SNR), a perceived SNR, or a measure of the echo return loss (ERL). The equalization applied to one or more acoustic signals may be based on an SNR (or adjusted SNR) or ERL. This may allow the present technology to minimize differences in a final transmit signal and make receive audio signals more audible and comfortable in quiet conditions.

The adaptive signal equalization techniques can be applied in single-microphone systems and multi-microphone systems which transform acoustic signals to the frequency domain, the cochlear domain, or any other domain. The systems and methods of the present technology can be applied to both near-end and far-end signals, as well as both the transmit and receive paths in a communication device. Audio processing as performed in the context of the present technology may be used with a variety of noise reduction techniques, including noise cancellation and noise suppression.

A detrimental side effect of suppressing a noise component of an acoustic signal is reduced intelligibility. Specifically, higher levels of noise suppression may cause high-frequency data attenuation. A user may perceive the processed signal as muffled. By performing signal equalization, such a side effect may be reduced or eliminated.

Signal consistency during a change in user environmental conditions may be improved by applying the present technology in both a near-end user environment and a far-end user environment. An initial approximation for the expected level of noise suppression applied to an acoustic signal is the inherent SNR of that signal, which may be received from a near-end audio source (such as the user of a communication device) or from a far-end speech source (which, for example, may be received from a mobile device in communication with the near-end user's device). Higher levels of noise suppression correlate to increased attenuation of high-frequency components in the suppressed signal. A signal with a lower initial signal-to-noise ratio will typically require a higher level of noise suppression. In post-processing of an acoustic signal, signal equalization may counteract the detrimental effects of noise suppression on signal quality and intelligibility.

In addition to inherent SNR, the present system may determine an SNR as perceived by a user (adjusted SNR). Depending on characteristics of the acoustic signal, a user may perceive a higher or lower SNR than inherently present. Specifically, the characteristics of the most dominant noise component in the signal may cause the perceived SNR to be lower than the inherent SNR. For example, a user perceives so-called "pink" noise differently than "white" noise. Broadband noise requires less suppression than narrow-band noise to achieve the same perceived quality/improvement for a user. Suppression of broadband noise affects high-frequency components differently than suppression of narrow-band noise. Through analysis of the spectral representation of the noise components in an acoustic signal (i.e., a quantification of the frequency distribution of the noise), an adjusted SNR may be determined as a basis for the equalization that may be performed in post-processing.

The level of equalization (EQ) to perform on an acoustic signal may be based on an adjusted SNR for the signal. In some embodiments, the post-processing equalization (EQ) is selected from a limited set of EQ curves, wherein the selection may be based on the adjusted SNR, as well as heuristics derived by testing and system calibration. The limited set may contain four EQ curves, but fewer or more is also possible. Moreover, because SNR may be determined per frequency sub-band, an adjusted SNR may be determined based on characteristics of the signal in the corresponding frequency sub-band, such as the user-perceived SNR, or any other quantification of the noise component within that sub-band. An example of voice equalization is described in U.S. patent application Ser. No. 12/004,788, entitled "System and Method for Providing Voice Equalization," filed Dec. 21, 2007, which is incorporated by reference herein.

Equalization may also be performed based on echo return loss for an acoustic signal. Some embodiments of the present technology employ a version of automatic echo cancellation (AEC) in the audio processing system of a communication device. In these embodiments, the near-end microphone(s) receive not only main speech, but also reproduced audio from the near-end output device, which causes echo. Echo return loss (ERL) is the ratio between an original acoustic signal and its echo level (usually described in decibels), such that a higher ERL corresponds to a smaller echo. ERL may be correlated to the user-perceived SNR of a signal. An audio processing system may estimate an expected amount of ERL, as a by-product of performing AEC, based on the far-end signal in a communication device and its inherent characteristics. An equalizer may be used to counteract the expected detrimental effects of noise suppression of either the near-end acoustic signal as used in the transmit path, or else the far-end signal in a communication device as used in the receive path, based on the estimated (expected) amount of ERL.

Embodiments of the present technology anticipate a user's behavior during changing conditions in the user environment. Assume for the following example that one user calls another user on a cell phone. Each user is likely to react to more noise in his environment by pressing the phone closer to his ear, which alters the spectral representation of the speech signal as produced by the user, as well as the speech signal received by the other user. For example, if the noise level in the far-end environment of the far-end speech source increases, a number of events are likely to occur. First, the far-end user may press his phone closer to his ear (to hear the transmitted near-end signal better), which alters the spectral characteristics of the speech signal produced by the far-end user. Second, the near-end user hears increased noise and may press the near-end phone closer to his ear (to hear the transmitted noisy far-end signal better). This will alter the spectral characteristics of the main speech signal produced by the near-end user. Typically, such a change in phone position causes a boost in low frequencies, which is detrimental to signal intelligibility. As a result, the far-end user may perceive a reduced SNR, and again react by pressing his far-end phone closer to his ear. Either near-end post-processing equalization, far-end post-processing equalization, or both can prevent this negative spiral of signal degradation. By boosting high frequencies through equalization, the detrimental effects of high levels of noise suppression, as well as the expected detrimental effects of the users' behavior in response to higher levels of noise, may be reduced or avoided.

Note that embodiments of the present technology may be practiced in an audio processing system that operates per frequency sub-band, such as described in U.S. patent application Ser. No. 11/441,675, entitled "System and Method for Processing an Audio Signal," filed May 25, 2006, which is incorporated by reference herein.

FIG. 1 illustrates an environment 100 in which embodiments of the present technology may be practiced. FIG. 1 includes near-end environment 120, far-end environment 140, and communication network 150 that connects the two. Near-end environment 120 includes user 102, exemplary communication device 104, and noise source 110. Speech from near-end user 102 is an audio source to communication device 104. Audio from user 102 (or "main talker") may be called main speech. The exemplary communication device 104 as illustrated includes two microphones: primary microphone 106 and secondary microphone 108 located a distance away from primary microphone 106. In other embodiments, communication device 104 includes one or more than two microphones, such as for example three, four, five, six, seven, eight, nine, ten or even more microphones.

Far-end environment 140 includes speech source 122, communication device 124, and noise source 130. Communication device 124 as illustrated includes microphone 126. Communication devices 104 and 124 both communicate with communication network 150. Audio produced by far-end speech source 122 (i.e., the far-end user) is also called far-end audio, far-end speech, or far-end signal. Noise 110 is also called near-end noise, whereas noise 130 is also called far-end noise. An exemplary scenario that may occur in environment 100 is as follows: user 102 places a phone call with his communication device 104 to communication device 124, which is operated by another user who is referred to as speech source 122. Both users communicate via communication network 150.

Primary microphone 106 and secondary microphone 108 in FIG. 1 may be omni-directional microphones. Alternatively, embodiments may utilize other forms of microphones or acoustic sensors/transducers. While primary microphone 106 and secondary microphone 108 receive and transduce sound (i.e., an acoustic signal) from user 102, they also pick up noise 110. Although noise 110 and noise 130 are shown coming from single locations in FIG. 1, they may comprise any sounds from one or more locations within near-end environment 120 and far-end environment 140, respectively, as long as they are different from user 102 and speech source 122, respectively. Noise may include reverberations and echoes. Noise 110 and noise 130 may be stationary, non-stationary, and/or a combination of both stationary and non-stationary. Echo resulting from far-end user and speech source 122 is typically non-stationary.

As shown in FIG. 1, the mouth of user 102 may be closer to primary microphone 106 than to secondary microphone 108. Some embodiments utilize level differences (e.g., energy differences) between the acoustic signals received by primary microphone 106 and secondary microphone 108. If primary microphone 106 is closer, the intensity level will be higher, resulting in a larger energy level received by primary microphone 106 during a speech/voice segment, for example. The inter-level difference (ILD) may be used to discriminate speech and noise. An audio processing system may use a combination of energy level differences and time delays to discriminate speech. Based on binaural cue encoding, speech signal extraction or speech enhancement may be performed. An audio processing system may additionally use phase differences between the signals coming from different microphones to distinguish noise from speech, or distinguish one noise source from another noise source.

Figure 2:
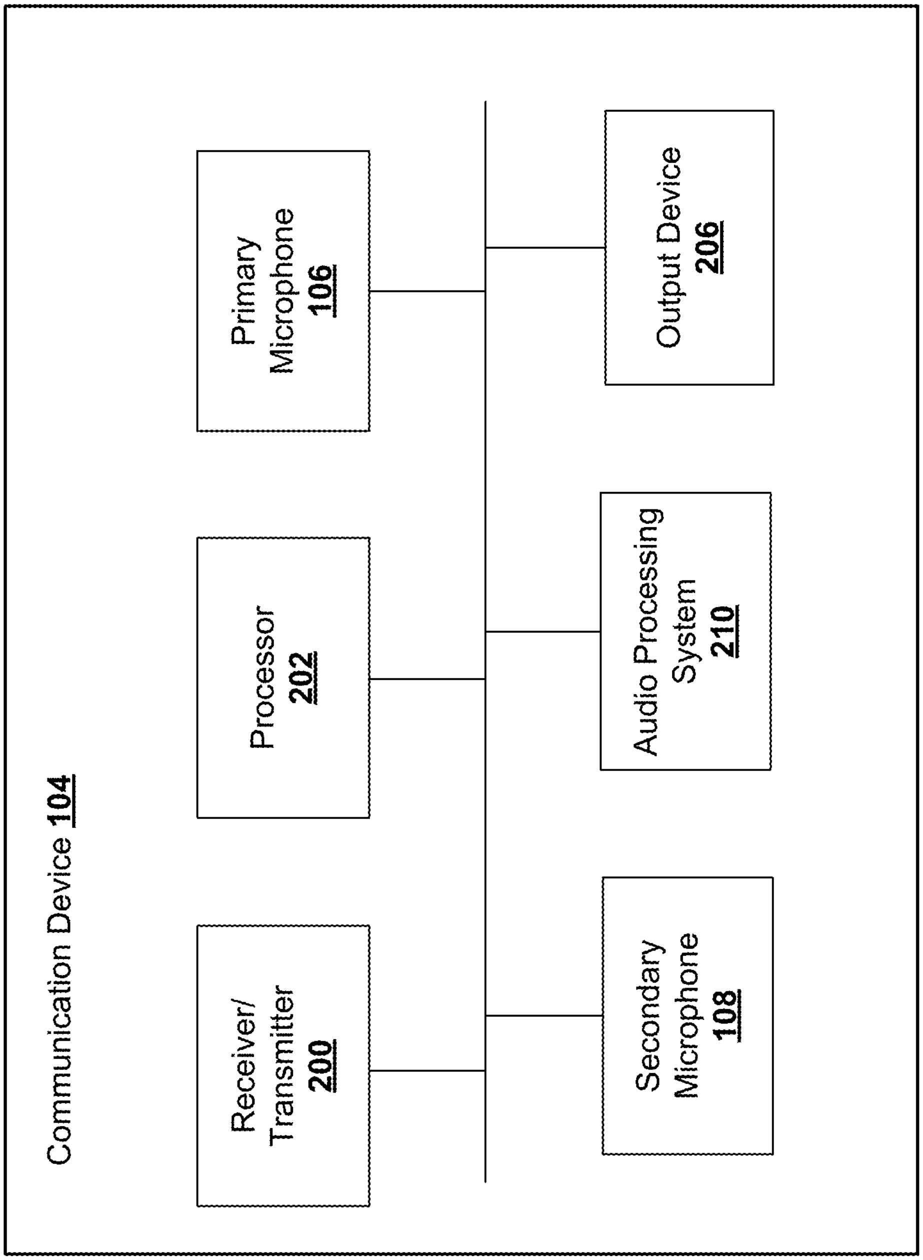
FIG. 2 is a block diagram of an exemplary communication device.

FIG. 2 is a block diagram of an exemplary communication device 104. In exemplary embodiments, communication device 104 (also shown in FIG. 1) is an audio receiving device that includes a receiver/transmitter 200, a processor 202, a primary microphone 106, a secondary microphone 108, an audio processing system 210, and an output device 206. Communication device 104 may comprise more or other components necessary for its operations. Similarly, communication device 104 may comprise fewer components that perform similar or equivalent functions to those depicted in FIG. 2. Additional details regarding each of the elements in FIG. 2 are provided below.

Processor 202 in FIG. 2 may include hardware and/or software, which implements the processing function, and may execute a program stored in memory (not pictured in FIG. 2). Processor 202 may use floating point operations, complex operations, and other operations. The exemplary receiver/transmitter 200 may be configured to receive and transmit a signal from a (communication) network. In some embodiments, the receiver/transmitter 200 includes an antenna device (not shown) for communicating with a wireless communication network, such as for example communication network 150 (FIG. 1). The signals received by receiver 200, primary microphone 106, and secondary microphone 108 may be processed by audio processing system 210 and provided to output device 206. For example, audio processing system 210 may implement noise reduction techniques on the received signals. The present technology may be used in both the transmit and receive paths of a communication device.

Primary microphone 106 and secondary microphone 108 (FIG. 2) may be spaced a distance apart in order to allow for an energy level difference between them. The acoustic signals received by primary microphone 106 and secondary microphone 108 may be converted into electric signals (i.e., a primary electric signal and a secondary electric signal). These electric signals are themselves converted by an analog-to-digital converter (not shown) into digital signals for processing in accordance with some embodiments. In order to differentiate the acoustic signals, the acoustic signal received by primary microphone 106 is herein referred to as the primary acoustic signal, while the acoustic signal received by secondary microphone 108 is herein referred to as the secondary acoustic signal.

In various embodiments, where the primary and secondary microphones are omni-directional microphones that are closely spaced (e.g., 1-2 cm apart), a beamforming technique may be used to simulate a forwards-facing and a backwards-facing directional microphone response. A level difference may be obtained using the simulated forwards-facing and the backwards-facing directional microphone. The level difference may be used to discriminate speech and noise, which can be used in noise and/or echo reduction.

Output device 206 in FIG. 2 may be any device that provides an audio output to a user or listener. For example, the output device 206 may comprise a speaker, an earpiece of a headset, or handset on communication device 104. In some embodiments, the acoustic signals from output device 206 are included as part of the (primary or secondary) acoustic signal. This may cause reverberations or echoes, either of which are generally referred to as noise. The primary acoustic signal and secondary acoustic signal may be processed by audio processing system 210 to produce a signal with improved audio quality for transmission across a communication network and/or routing to output device 206.

Embodiments of the present invention may be practiced on any device configured to receive and/or provide audio such as, but not limited to, cellular phones, phone handsets, headsets, and systems for teleconferencing applications. While some embodiments of the present technology are described in reference to operation on a cellular phone, the present technology may be practiced on any communication device.

Some or all of the above-described modules in FIG. 2 may be comprised of instructions that are stored on storage media. The instructions can be retrieved and executed by processor 202. Some examples of instructions include software, program code, and firmware. Some examples of non-transitory storage media comprise memory devices and integrated circuits. The instructions are operational when executed by processor 202 to direct processor 202 to operate in accordance with embodiments of the present technology. Those skilled in the art are familiar with instructions, processor(s), and (non-transitory computer readable) storage media.

Figure 3:
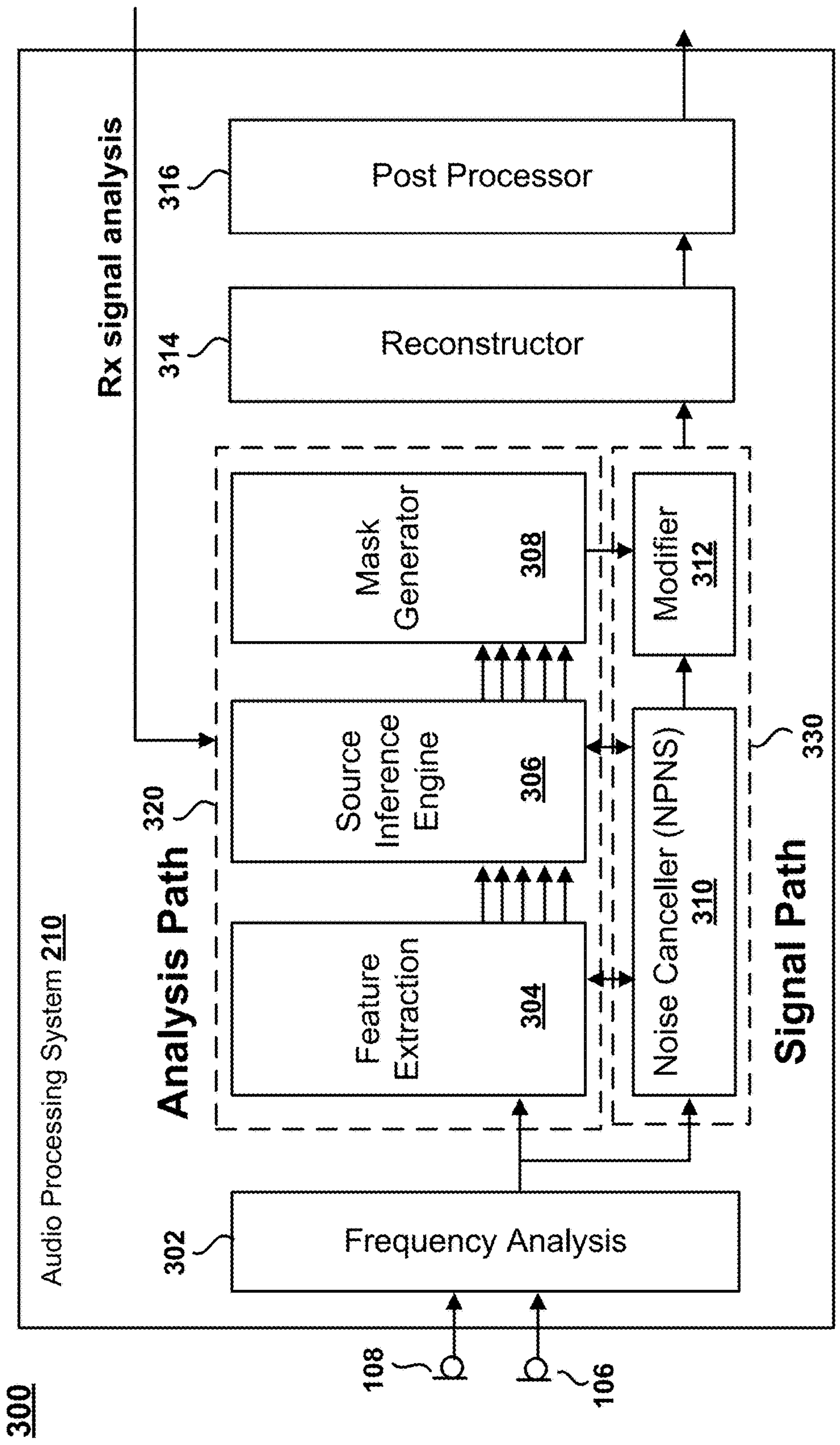
FIG. 3 is a block diagram of an exemplary audio processing system.

FIG. 3 is a block diagram of an exemplary audio processing system 210. In exemplary embodiments, audio processing system 210 (also shown in FIG. 2) is embodied within a memory device inside communication device 104. Audio processing system 210 may include a frequency analysis module 302, a feature extraction module 304, a source inference module 306, a mask generator module 308, noise canceller (NPNS) module 310, modifier module 312, reconstructor module 314, and post-processing module 316.

Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In the audio processing system of FIG. 3, acoustic signals received from primary microphone 106 and secondary microphone 108 are converted to electrical signals, and the electrical signals are processed by frequency analysis module 302. Frequency analysis module 302 receives the acoustic signals and mimics the frequency analysis of the cochlea, e.g., simulated by a filter bank. Frequency analysis module 302 separates each of the primary and secondary acoustic signals into two or more frequency sub-band signals for each microphone signal. A sub-band signal is the result of a filtering operation on an input signal, where the bandwidth of the filter is narrower than the bandwidth of the signal received. Alternatively, other filters such as short-time Fourier transform (STFT), sub-band filter banks, modulated complex lapped transforms, cochlear models, wavelets, etc., can be used for the frequency analysis and synthesis.

Frames of sub-band signals are provided by frequency analysis module 302 to an analysis path sub-system 320 and to a signal path sub-system 330. Analysis path sub-system 320 may process a signal to identify signal features, distinguish between (desired) speech components and (undesired) noise and echo components of the sub-band signals, and generate a signal modifier. Signal path sub-system 330 modifies sub-band signals of the primary acoustic signal, e.g., by applying a modifier such as a multiplicative gain mask, or by using subtractive signal components generated in analysis path sub-system 320. The modification may reduce undesired components (i.e., noise) and preserve desired speech components (i.e., main speech) in the sub-band signals.

Signal path sub-system 330 within audio processing system 210 of FIG. 3 includes noise canceller module 310 and modifier module 312. Noise canceller module 310 receives sub-band frame signals from frequency analysis module 302 and may subtract (e.g., cancel) a noise component from one or more sub-band signals of the primary acoustic signal. As such, noise canceller module 310 may provide sub-band estimates of noise components and speech components in the form of noise-subtracted sub-band signals.

An example of null processing noise subtraction performed in some embodiments by the noise canceller module 310 is disclosed in U.S. application Ser. No. 12/422,917, entitled "Adaptive Noise Cancellation," filed Apr. 13, 2009, which is incorporated herein by reference.

Noise reduction may be implemented by subtractive noise cancellation or multiplicative noise suppression. Noise cancellation may be based on null processing, which involves cancelling an undesired component in an acoustic signal by attenuating audio from a specific direction, while simultaneously preserving a desired component in an acoustic signal, e.g., from a target location such as a main speaker. Noise suppression uses gain masks multiplied against a sub-band acoustic signal to suppress the energy level of a noise (i.e., undesired) component in a sub-band signal. Both types of noise reduction systems may benefit from implementing the present technology, since it aims to counteract systemic detrimental effects of certain types of signal processing on audio quality and intelligibility.

Analysis path sub-system 320 in FIG. 3 includes feature extraction module 304, source inference module 306, and mask generator module 308. Feature extraction module 304 receives the sub-band frame signals derived from the primary and secondary acoustic signals provided by frequency analysis module 302 and receives the output of noise canceller module 310. The feature extraction module 304 may compute frame energy estimations of the sub-band signals, an inter-microphone level difference (ILD) between the primary acoustic signal and secondary acoustic signal, and self-noise estimates for the primary and secondary microphones. Feature extraction module 304 may also compute other monaural or binaural features for processing by other modules, such as pitch estimates and cross-correlations between microphone signals. Feature extraction module 304 may both provide inputs to and process outputs from noise canceller module 310.

Source inference module 306 may process frame energy estimations to compute noise estimates, and may derive models of noise and speech in the sub-band signals. Source inference module 306 adaptively estimates attributes of acoustic sources, such as the energy spectra of the output signal of noise canceller module 4310. The energy spectra attribute may be used to generate a multiplicative mask in mask generator module 308.

Source inference module 306 in FIG. 3 may receive the ILD from feature extraction module 304 and track the ILD-probability distributions or "clusters" of user 102's (main speech) audio source, noise 110, and optionally echo. Source inference module 306 may provide a generated classification to noise canceller module 310, which may utilize the classification to estimate noise in received microphone energy estimate signals. A classification may be determined per sub-band and time-frame as a dominance mask as part of a cluster tracking process. In some embodiments, mask generator module 308 receives the noise estimate directly from noise canceller module 310 and an output of the source inference module 306. Source inference module 406 may generate an ILD noise estimator, and a stationary noise estimate.

Mask generator module 308 receives models of the sub-band speech components and noise components as estimated by source inference module 306. Noise estimates of the noise spectrum for each sub-band signal may be subtracted out of the energy estimate of the primary spectrum to infer a speech spectrum. Mask generator module 308 may determine a gain mask for the sub-band signals of the primary acoustic signal and provide the gain mask to modifier module 312. Modifier module 312 multiplies the gain masks with the noise-subtracted sub-band signals of the primary acoustic signal. Applying the mask reduces the energy level of noise components and thus accomplishes noise reduction.

Reconstructor module 314 converts the masked frequency sub-band signals from the cochlea domain back into the time domain. The conversion may include adding the masked frequency sub-band signals and phase shifted signals. Alternatively, the conversion may include multiplying the masked frequency sub-band signals with an inverse frequency of the cochlea channels. Once conversion to the time domain is completed, the synthesized acoustic signal may be post-processed and provided to the user via output device 206 and/or provided to a codec for encoding.

In some embodiments, additional post-processing of the synthesized time domain acoustic signal is performed, for example by post-processing module 316 in FIG. 3. This module may also perform the (transmit and receive) post-processing equalization as described in relation to FIG. 4. As another example, post-processing module 316 may add comfort noise generated by a comfort noise generator to the synthesized acoustic signal prior to providing the signal either for transmission or an output device. Comfort noise may be a uniform constant noise that is not usually discernible to a listener (e.g., pink noise). This comfort noise may be added to the synthesized acoustic signal to enforce a threshold of audibility and to mask low-level non-stationary output noise components. In some embodiments, the comfort noise level is chosen to be just above a threshold of audibility and/or may be settable by a user.

The audio processing system of FIG. 3 may process several types of (near-end and far-end) signals in a communication device. The system may process signals, such as a digital Rx signal, received through an antenna, communication network 150 (FIG. 1) or 440 (FIG. 4), or other connection.

A suitable example of an audio processing system 210 is described in U.S. application Ser. No. 12/832,920, entitled "Multi-Microphone Robust Noise Suppression," filed Jul. 8, 2010, the disclosure of which is incorporated herein by reference.

Figure 4:
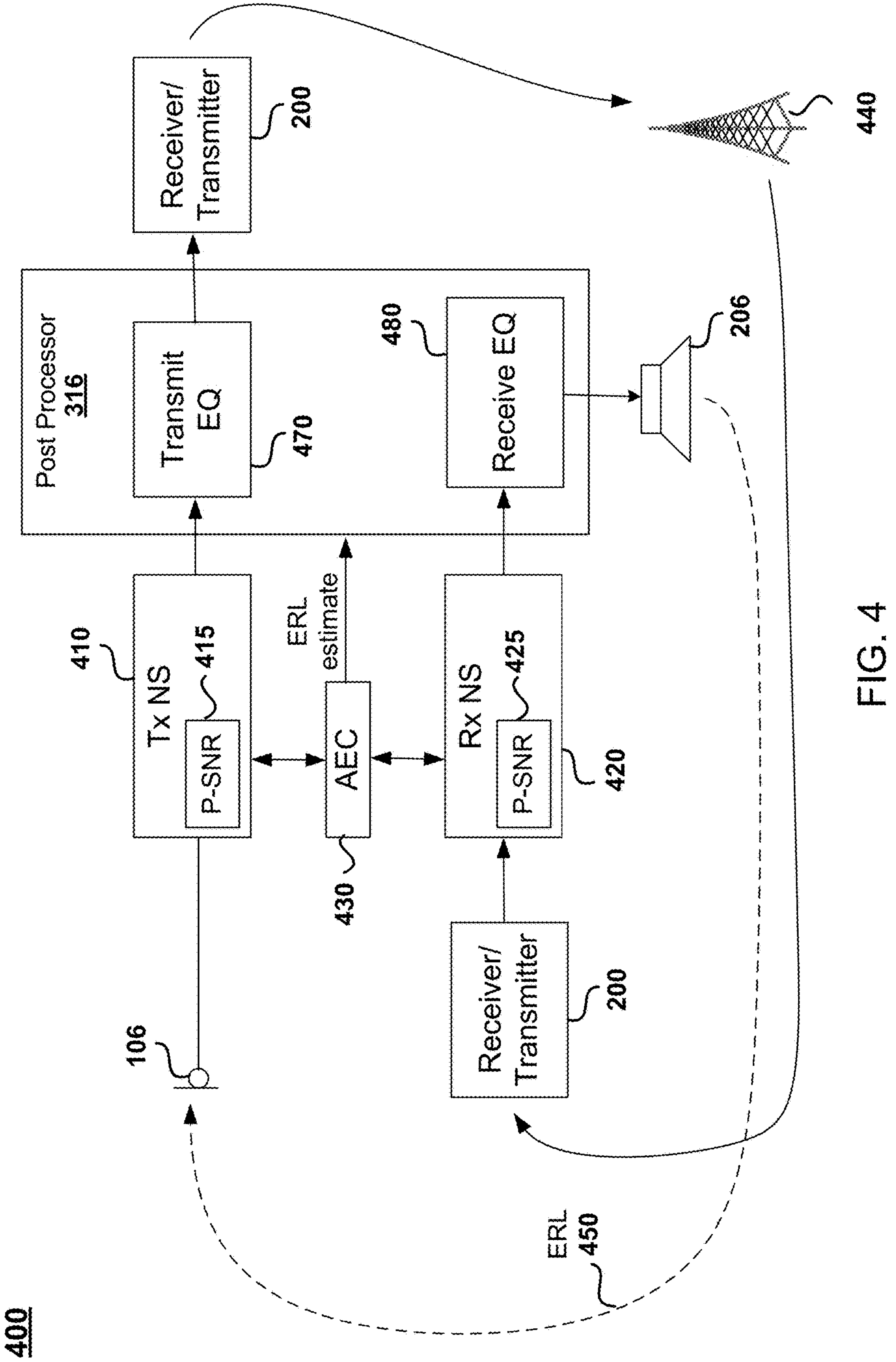
FIG. 4 is a block diagram of an exemplary post processor module.

FIG. 4 is a block diagram of an exemplary post processor module 316. Post processor module 316 includes transmit equalization module 470 and receive equalization module 480. Post processor 316 may communicate with receiver/transmitter 200, transmit noise suppression module 410, receive noise suppression module 420, and automatic echo cancellation (AEC) module 430. Transmit noise suppression module 410 includes perceived (i.e., adjusted) signal-to-noise ratio (P-SNR) module 415 and receive noise suppression module 420 includes a P-SNR 425. Each P-SNR module may also be located outside a noise suppression module. Automatic echo cancellation (AEC) module 430 may communicate with each of suppression modules 410 and 420 and post processor module 316. Suppression modules 410 and 420 may be implemented within noise canceller module 310, mask generator module 308, and modifier module 312. AEC module 430 may be implemented within source inference engine 306.

Transmit noise suppression module 410 receives acoustic sub-band signals derived from an acoustic signal provided by primary microphone 106. Transmit noise suppression module 410 may also receive acoustic sub-band signals from other microphones. Primary microphone 106 may also receive a signal provided by output device 206, thereby causing echo return loss (ERL). An amount of expected ERL may be estimated by AEC module 430, as an ERL estimate, and provided to post processor module 316. In operation, primary microphone 106 receives an acoustic signal from a near-end user (not shown in FIG. 4), wherein the acoustic signal has an inherent SNR and a noise component. Transmit noise suppression module 410 may suppress the noise component from the received acoustic signal.

P-SNR module 415 may automatically determine an adjusted signal-to-noise ratio based on the characteristics of the incoming near-end acoustic signal received by primary microphone 106. This adjusted (transmit) SNR may be provided to either transmit EQ module 470 or receive EQ module 480 as a basis to perform equalization.

Transmit EQ module 470 may perform equalization on the noise suppressed acoustic signal. The equalization performed by EQ module 470 may be based on the adjusted SNR determined by P-SNR module 415. After equalizing the signal, the resulting signal may be transmitted over a communication network to another communication device in a far-end environment (not shown in FIG. 4).

Similarly, an adjusted SNR may be determined for a received signal by P-SNR 425. The received signal may then be suppressed by receive suppression module 420 and equalized based on the adjusted SNR for the signal received by receiver/transmitter 200.

Signals received from a far-end environment may also be equalized by post processor 316. A signal may be received by receiver/transmitter 200 from a far-end environment, and have an inherent SNR and a noise component. Receive noise suppression module 420 may suppress the noise component contained in the far-end signal.

In the receive path, P-SNR module 425 may automatically determine an adjusted signal-to-noise ratio based on the characteristics of the incoming far-end signal. This adjusted (receive) SNR may be provided to either transmit equalizer 470 or receive equalizer 480 as a basis to perform equalization. The acoustic signal from output device 206 may cause echo return loss (ERL) 450 through primary microphone 106. AEC module 430 may generate and provide an ERL estimate while performing automatic echo cancellation based on the far-end signal in the communication device. The ERL estimate may be provided to post processor 316 for use in performing equalization, for example by either transmit equalizer 470 or receive equalizer 480. Receive equalizer 480 may perform equalization on the noise-suppressed far-end signal based on the ERL estimate. The equalized signal may then be output by output device 206.

Figure 5:
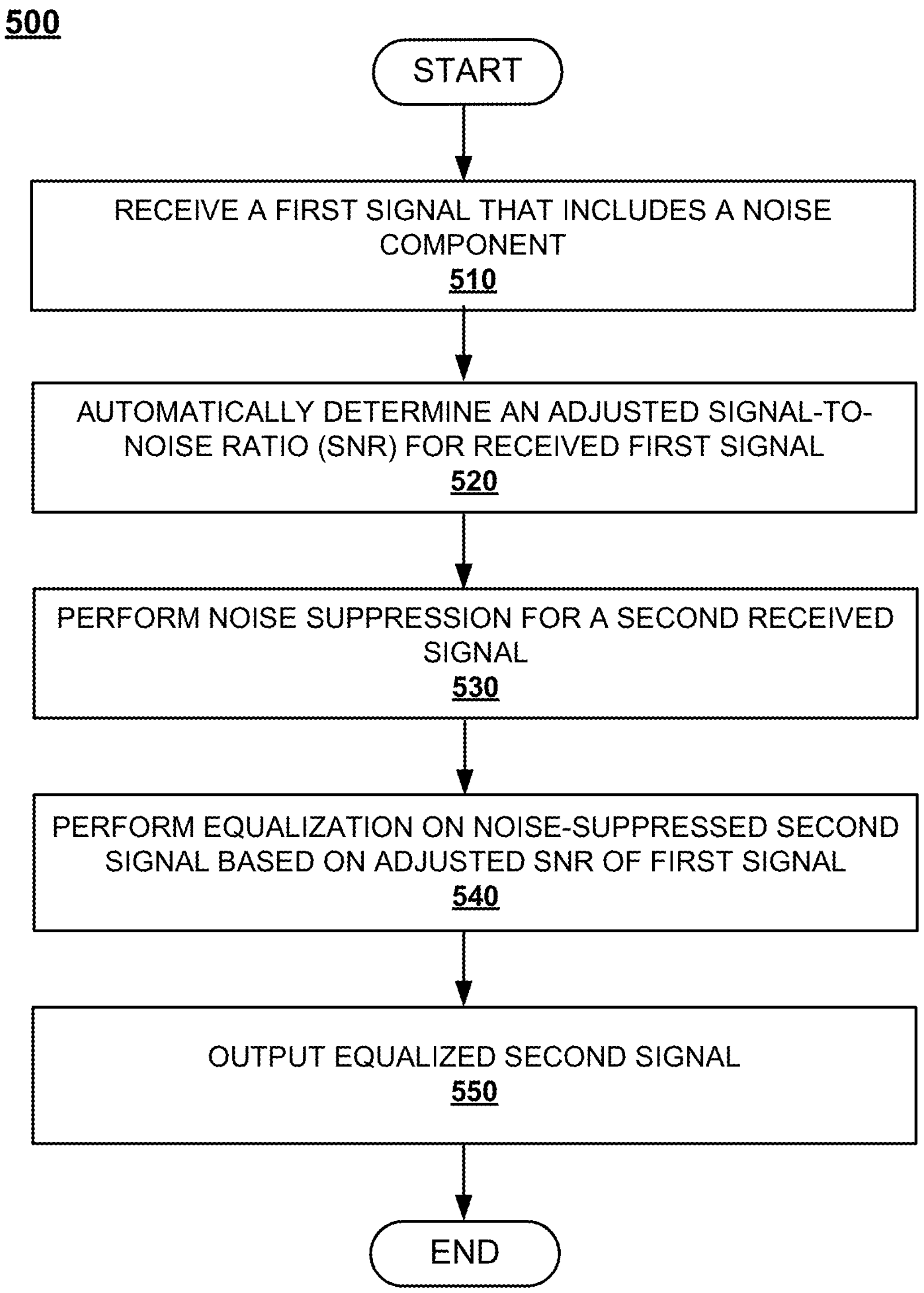
FIG. 5 illustrates a flow chart of an exemplary method for performing signal equalization based on a signal-to-noise ratio.

FIG. 5 illustrates a flow chart of an exemplary method for performing signal equalization based on a signal-to-noise ratio. A first signal with a noise component is received at step 510. With respect to FIG. 4, the first signal may be a signal received through primary microphone 106 or a signal received through receiver/transmitter 200 (coupled to receive suppression module 420). For the purpose of discussion, it will be assumed that the signal was received via primary microphone 106.

An adjusted SNR is automatically determined for the received signal at step 520. The adjusted SNR may be determined by P-SNR module 425 for a signal received via primary microphone 106. The adjusted SNR may be a perceived SNR which is determined based on features in the received signal.

Noise suppression is performed for a second received signal at step 530. When the first signal is received via primary microphone 106, the second signal may be received via receiver/transmitter 200 and may undergo noise suppression processing by receive noise suppression module 420.

Equalization may be performed on the noise-suppressed second signal based on the P-SNR of the first signal at step 540. Receive EQ module 480 may perform equalization on the signal received and processed via receive suppression module 420 based on the P-SNR (adjusted SNR) determined by P-SNR module 425 for the first signal. The equalization may be applied to the second signal as one of several gain curves, wherein the particular gain curve is selected based on the P-SNR of the first signal. After performing equalization, the equalized second signal is output at step 550. The signal may be output by receiver/transmitter 200 or via output device 206.

Though an example of a first signal received via primary microphone 106 was discussed, the first signal may be received as a far-end signal via receiver/transmitter 200. In this case, the signal is received via receiver 200, noise suppressed by receive suppression module 420, a P-SNR is determined by P-SNR 425, and equalization is performed to a second signal received from primary microphone 106 by transmit equalization module 470.

The noise suppression, equalization and output may all be performed to the same signal. Hence, a first signal may be received at primary microphone 106, noise suppression may be performed on the signal by transmit suppression module 410, a P-SNR may be determined by P-SNR module 415, and equalization may be performed on the first signal at transmit equalization module 470.

The steps of method 500 are exemplary, and more or fewer steps may be included in the method of FIG. 5. Additionally, the steps may be performed in a different order than the exemplary order listed in the flow chart of FIG. 5.

Figure 6:
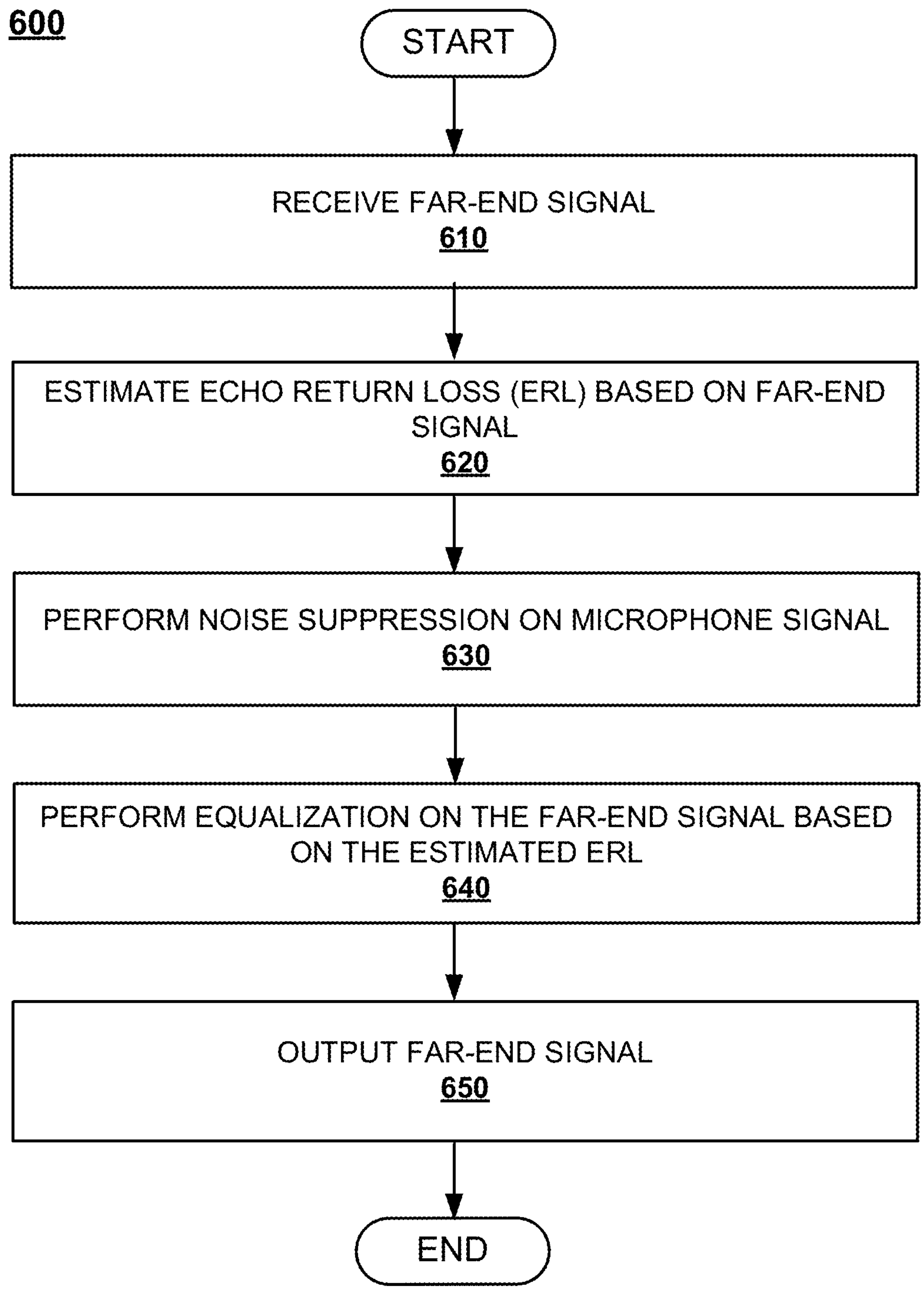
FIG. 6 illustrates a flow chart of an exemplary method for performing signal equalization based on echo return loss.

FIG. 6 illustrates a flow chart of an exemplary method for performing signal equalization based on echo return loss. First, a far-end signal is received at step 610. The far-end signal may be received by receiver/transmitter 200 and ultimately provided to receive noise suppression module 420.

An echo return loss may be estimated based on the far-end signal at step 620. The echo return loss for the far-end signal may be the ratio of the far-end signal and its echo level (usually described in decibels). The echo level may be determined by the amount of signal that is suppressed by receive suppression module 420, equalized by receive EQ module 480, output by output device 206, and received as ERL 450 by primary microphone 106. Generally, a higher ERL corresponds to a smaller echo.

Noise suppression may be performed on a microphone signal at step 630. The noise suppression may be performed by transmit noise suppression module 410. Equalization may then be performed on far-end signal based on the estimated ERL at step 640. The equalization may be performed by transmit EQ module 470 on the noise-suppressed microphone far-end signal. One of several equalization levels or curves may be selected based on the value of the ERL.

After equalization, the far-end signal is output at step 650. The far-end signal may be output through output device 206.

Multiple EQ curves may be used to minimize the changes in frequency response. For example, four EQ curves based on SNR conditions may be selected based on an API to update EQ coefficients regularly while application query and read SNR conditions.

As a user presses the handset to his/her ear harder to hear the remote party better in noisier environments, the ERL can be changed/increased. We can adjust Tx and Rx equalization functions based on the ERL changes to improve intelligibility.

For the Rx side, typical mobile handset manufacturers often employ a tuning strategy to boost high pitched equalization characteristics to improve intelligibility. However, this approach has limitations since typically cell phones have only one equalization setting regardless of noise conditions. The present technology will allow much greater flexibility by detecting SNR conditions, and using an adjusted SNR to apply different Rx equalization parameters to make Rx audio more audible and comfortable in quiet conditions. Rx Equalization function can be adjusted based on the near-end noise condition. Different Rx Post Equalization functions can be applied based on near-end noise condition.

The present technology is described above with reference to exemplary embodiments. It will be apparent to those skilled in the art that various modifications may be made and other embodiments can be used without departing from the broader scope of the present technology. For example, embodiments of the present invention may be applied to any system (e.g., non-speech enhancement system) utilizing AEC. Therefore, these and other variations upon the exemplary embodiments are intended to be covered by the present disclosure.

The invention claimed is:

1. A method for audio processing in a communication device, comprising:

based on the characteristics of a first acoustic signal, the first acoustic signal representing at least one captured sound and having a signal-to-noise ratio, automatically determining an adjusted signal-to-noise ratio;

suppressing, using at least one hardware processor, a noise component of a second acoustic signal, the second acoustic signal representing at least one captured sound; and performing equalization on the noise-suppressed second acoustic signal based on the adjusted signal-to-noise ratio of the first acoustic signal.

2. The method of claim 1, wherein the characteristics of the first signal are selected to approximate a user's perception of the signal-to-noise ratio of the first signal.

3. The method of claim 1, wherein the characteristics of the first signal include a quantification of a frequency distribution of the noise component of the first signal.

4. The method of claim 1, wherein the determination, suppression, and equalization steps are performed per frequency sub-band.

5. The method of claim 1, wherein suppressing the noise component of the second signal is accomplished by using null processing techniques.

6. The method of claim 1, wherein:

one of the first and second acoustic signals is a near-end acoustic signal; and the other of the first and second acoustic signals is a far-end acoustic signal.

7. The method of claim 1, wherein the performing of the equalization on the noise-suppressed second acoustic signal based on the adjusted signal-to-noise ratio of the first acoustic signal is further based on a selected one of a set of equalization curves.

8. The method of claim 1, wherein the performing of the equalization on the noise-suppressed second acoustic signal comprises increasing high frequency levels in response to an increase of the adjusted signal-to-noise ratio of the first acoustic signal.

9. A method for audio processing in a communication device, comprising:

suppressing a noise component of a first signal, wherein the first signal is selected from a group consisting of a near-end acoustic signal and a far-end signal;

automatically determining, based on characteristics of the first signal, one of an estimated amount of echo return loss and an adjusted signal-to-noise ratio of the first signal; and performing equalization on the noise-suppressed first signal based on the one of the estimated amount of echo return loss and the adjusted signal-to-noise ratio of the first signal.

10. The method of claim 9, wherein suppressing the noise component of the first signal is accomplished by using null processing techniques.

11. A system for audio processing in a communication device, comprising:

a first executable module that determines, using at least one hardware processor, an adjusted signal-to-noise ratio of a first acoustic signal based on characteristics of the first acoustic signal, the first acoustic signal representing at least one captured sound;

a second executable module that suppresses a noise component in a second acoustic signal, the second acoustic signal representing at least one captured sound; and an equalizer that equalizes the noise-suppressed second acoustic signal based on the adjusted signal-to-noise-ratio of the first acoustic signal.

12. The system of claim 11, wherein the characteristics of the first acoustic signal are selected to approximate a user's perception of the signal-to-noise ratio of the first acoustic signal.

13. The system of claim 11, wherein the characteristics of the first acoustic signal include a quantification of a frequency distribution of the noise component.

14. The system of claim 11, wherein the first executable module that determines the adjusted signal-to-noise ratio, the second executable module that suppresses the noise component, and the equalizer, operate per frequency subband.

15. A non-transitory computer readable storage medium having embodied thereon a program, the program being executable by a processor to perform a method for audio processing in a communication device, the method comprising:

based on the characteristics of a first acoustic signal, the first acoustic signal representing at least one captured sound and having a signal-to-noise ratio, automatically determining an adjusted signal-to-noise ratio;

suppressing, using at least one hardware processor, a noise component of a second acoustic signal, the second acoustic signal representing at least one captured sound; and performing equalization on the noise-suppressed second acoustic signal based on the adjusted signal-to-noise ratio of the first acoustic signal.

16. The non-transitory computer readable storage medium of claim 15, wherein the characteristics of the first acoustic signal are selected to approximate a user's perception of the signal-to-noise ratio of the first acoustic signal.

17. The non-transitory computer readable storage medium of claim 15, wherein the characteristics of the first acoustic signal include a quantification of a frequency distribution of the noise component of the first acoustic signal.

18. The non-transitory computer readable storage medium of claim 15, wherein suppressing the noise component of the second acoustic signal is accomplished by using null processing techniques.

* * * * *